Patented Aug. 11, 1953

2,648,678

UNITED STATES PATENT OFFICE 2,648,678

PROCESS OF PREPARING ARALKYL CARBONATES

Charles Adam Heiberger, Nitro, W. Va., assignor to Ohio-Apex, Inc., Nitro, W. Va., a corporation of West Virginia No Drawing. Application January 13, 1951,
Serial No. 205,967

10 Claims. (Cl. 260—332.5)

The present invention relates to a method of preparing organic carbonates from organic chlorides, which possess a reactive

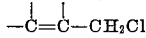

group such as, for instance, benzyl chloride. More specifically this invention relates to the preparation of carbonates from certain of said organic chlorides.

In general, organic carbonate esters have been previously prepared in limited amounts or on a laboratory scale by various methods, including the well known methods which comprise either the reaction of alcohols with phosgene (or with esters of chloroformic acid) or the reaction of alkyl iodides with silver carbonate. Such methods require relatively expensive reactants or special processing techniques or both. Yield is not always satisfactory, and organic carbonate esters made by such processes are usually not available except in special applications where expense is warranted.

The principal object of the present invention is the provision of methods by which carbonates, and particularly certain aralkyl and thenyl carbonates, may be prepared in such quantities and at such costs as will insure the availability of these carbonates as commercially useful substances. Other and more detailed objects will be apparent from the following description of the invention.

The reaction with which this invention is concerned is essentially

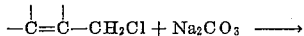

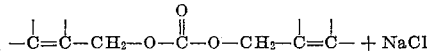

As written the reaction is not effective to achieve any noticeable yield of carbonate. However, I have found that if the reaction is catalyzed by the addition to the reaction mixture of certain amines, the reaction moves sufficiently to produce substantial yields of carbonate. The compounds which so act to promote the reaction are of that type in which each of three valences of the nitrogen is satisfied by attachment to a carbon atom of an organic group, no more than two of such valences being attached to the same carbon atom. The compounds of this type to which his invention relates will hereinafter be more specifically defined. These amines are catalytic in action. They are not exhausted during the reaction. The amount of the amine which, if present, will promote the reaction has no quantitative reactive relation to the amount of the reactants. The reaction will proceed as long as very small amounts of this catalytic compound are present. It is, of course, desirable to use as little as possible of the catalytic compound in order to minimize cost. Generally, an amount of the catalyst corresponding to about .01 to .1 mol per mol of the organic chloride reactant will produce good yields. Greater amounts are not harmful, except as bulk affects handling of the reaction mixture and may, therefore, somewhat reduce the yields.

The carbonate component of the reaction is either sodium carbonate or sodium bicarbonate, the latter being the equivalent of the first except that the formation of ether by-products may be somewhat higher when the bicarbonate is used. Both are herein comprehended by the term "carbonate of sodium." Corresponding potassium salts are ineffective to produce comparable yields, a drop of 80 to 90 per cent in effective yield being observed when attempt is made to substitute the potassium carbonates. Similar ineffective results are obtained with carbonates of ammonium, lithium, zinc, barium, magnesium and calcium. Likewise other organic halides possessing the

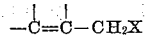

group, when used in the reaction in place of the chloride, have not, so far, proved successful. The catalyzed reaction of this invention is therefore efficient only when the reaction mixture contains a compound possessing a

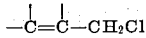

group, the essential carbonate of sodium and the catalyst. A molar excess of the carbonate component promotes the efficiency of the reaction. The effect produced by the excess is one of efficiency resulting only in better yield. Economically a molar excess of carbonate is desirable but amounts above about 200 per cent excess usually cease to be economic, from the standpoint of production in bulk, because yield does not further increase to justify reactant cost. In addition, the mixing or handling difficulties created by an "overload" of the carbonate may actually decrease yield below the optimum which could otherwise be obtained.

The reaction mixture should be non-aqueous in the sense that water is not present as a reaction medium or menstruum. Unsatisfactory yields are obtained when over about 2 per cent of free water by weight of the total reaction mass is present. Whenever possible, conditions should be adjusted to exclude moisture and preferably the free moisture content of the reaction mixture should be less than 1 per cent by weight for best results. Water present in the mixture and combined physically or chemically to the extent that it is not available as moisture does not seriously affect the reaction.

When there is present in the reaction mixture the

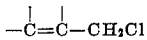

group, carbonate of sodium and catalytic compound, the reaction proceeds to yields which are substantial as compared with the negligible yields produced in the absence of the catalyst. This improved effect is not inhibited by the presence of inert substances in the reaction mixture which at the worst, because of mechanical blocking or mass action effects, may merely diminish the yield.

The reaction does not normally proceed with any real effect below about 50° centigrade. The efficiency of the reaction increases as the temperature rises and usually will be found to be commercially satisfactory at between 80 and 130° centigrade, the optimum yield being usually achieved within this range. A limiting factor in reaction temperature, apart from cost, is one of decomposition or polymerization of the reaction furnishing the

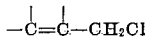

group. Sometimes such components will economically permit of higher reaction temperatures where polymerization or decomposition is slight. The reaction will not be blocked by such higher temperatures but yields, of course, will be reduced, at least to the extent that the amount of component containing the

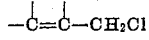

group is diminished. Subject to these considerations reaction temperatures as high as 150° C. can be used.

The nature of the compound containing the

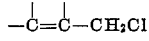

group does not appear to prevent an improved effect caused by the use of the catalyst. From a commercial standpoint, however, yield may be affected by polymerization, by the molecular bulk of the radical to which the chloride group is attached, and likewise by strongly polar groups, such as nitro groups, which by number or effect reduce the reaction efficiency of the

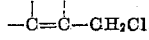

group. Reaction efficiency may also be affected by the position of other groups.

The specific chloride compounds which are of greatest usefulness to carbonate production in accordance with this invention, from the standpoint of reaction efficiency, stability of the

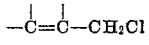

group in the reaction mixture and absence of strongly polar groups or other groups which inhibit or prevent realization of the full potentialities of the reaction, are those selected from the class consisting of benzyl chloride, naphthobenzyl chloride, thenyl chloride, methyl substituted naphthobenzyl chlorides, benzyl, naphthobenzyl and thenyl chlorides substituted with not more than two halogens of atomic numbers greater than 9, and such benzyl and halogen substituted benzyl chlorides as are substituted with substituents, which are selected from the class consisting of alkyl, alkoxy, phenyl and phenoxy groups, the total carbons of all such substituents being less than 7.

Examples of specific chlorides of this class are: benzyl chloride; methyl benzyl chloride; ethyl benzyl chloride; isopropyl benzyl chloride; secondary butyl benzyl chloride; amyl benzyl chloride; hexyl benzyl chloride; dimethyl benzyl chloride; 2,4 dimethyl benzyl chloride; diethyl benzyl chloride; diisopropyl benzyl chloride; trimethyl benzyl chloride; 2,4,6 trimethyl benzyl chloride; triethyl benzyl chloride; polymethyl benzyl chloride; 2-methyl, 5-isopropyl benzyl chloride; methyl, amyl benzyl chloride; ethyl, sec. butyl benzyl chloride; ortho-chlor benzyl chloride; para-chlor benzyl chloride; 2,4 dichlor benzyl chloride; 3,4 dichlor benzyl chloride; brom benzyl chloride; chlor dimethyl benzyl chloride; dichlor dimethyl benzyl chloride; 5-brom 2,4-dimethyl benzyl chloride; iododimethyl benzyl chloride; brom, sec. butyl benzyl chloride; ortho-chlor para-amyl benzyl chloride; iodo ethyl benzyl chloride; dibrom benzyl chloride; ethoxy benzyl chloride; diethoxy benzyl chloride; butoxy benzyl chloride; 2-ethoxy, 4-butoxy benzyl chloride; phenyl benzyl chloride; phenoxy benzyl chloride; 2-chlor 4-ethoxy benzyl chloride; 3-bromo 4-amyloxy benzyl chloride; 2-iodo 4-phenyl benzyl chloride; para-bromo, phenyl benzyl chloride; ortho-chlor, phenoxy benzyl chloride; 2-bromo 4-phenoxy benzyl chloride; naphthobenzyl chloride; alpha-methyl naphthobenzyl chloride; beta-methyl naphthobenzyl chloride; dimethyl naphthobenzyl chloride; alpha-chlor naphthobenzyl chloride; dichlor naphthobenzyl chloride; beta-bromo naphthobenzyl chloride; iodo naphthobenzyl chloride; alpha-methyl-beta-chlor naphthobenzyl chloride; thenyl chloride; 5-chloro 2-thenyl chloride; 2,5 dichloro, 3-thenyl chloride; 5-iodo-2-thenyl chloride.

The catalysts are of the type in which the valences of the nitrogen

are each satisfied by attachment to a carbon atom of an organic group, no more than two of such valences being satisfied by a single carbon atom. In general the tertiary amines and quaternary ammonium compounds which have three nitrogen valences satisfied as above described are effective as catalysts to some degree. Morpholine does not have a catalytic effect but when substituted to satisfy the valence requirements above set forth, the so substituted morpholine has catalytic effect as do also the morpholinium halides wherein nitrogen valences are satisfied as above mentioned. Pyridine, the substituted pyridines and triethanol amine have, for example, nitrogens

the valences of which are each satisfied by attachment to carbon atoms of an organic group, with no more than two of said valences being satisfied by a single carbon atom, and these compounds are catalytic in the reaction herein described. Urea, in which the nitrogen valences are not so satisfied, is not catalytic in action, but substituted ureas in which at least one of the nitrogens has its valences so satisfied are catalytic. From the standpoint of efficiency these nitrogen compounds are not equal in catalytic effect, some being more active than others and many being, from a commercial standpoint, of such limited activity as to preclude their use in large scale processes.

Those nitrogen compounds of the type above described best suited to the purposes of my invention from the standpoint of efficiency are selected from the class consisting of the compounds set forth in Table I.

Table I

1. Pyridine;
2. Methyl pyridines;
3. Triethanol amine;
4. Ureas of general formula

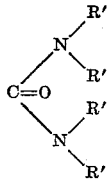

wherein R' represents a group selected from the class consisting of hydrogen and unsubstituted alkyl groups having less than 5 carbon atoms and wherein the R' groups attached to at least one of the nitrogens are alkyl;

5. Substituted morpholines of general formula OC$_4$H$_8$N—R wherein R represents an unsubstituted alkyl group having less than 7 carbon atoms;
6. Tertiary amines of general formula

wherein R is as above defined; wherein R$_b$ represents a group selected from the class consisting of unsubstituted alkyl groups of less than 19 carbons, ethyl, propyl and benzyl groups having less than three hydrogens thereof replaced by groups selected from the class consisting of NR'$_2$ and OH, substituted alkyl groups of less than 21 carbons, no more than 6 of which are ring bound carbons, wherein hydrogen is replaced with a group selected from the class consisting of the substituent groups phenyl, phenoxy, alkenyl, alkenyloxy, alkyl, alkoxy, halogen substituted phenyl and halogen substituted phenoxy groups, and any of said substituent groups wherein a hydrogen thereof is replaced by another of said substituent groups, the halogens contained in said halogen substituted groups being of atomic number greater than 9 and replacing less than 3 hydrogens of said groups; and wherein R$_a$ represents any group selected from the class of R$_b$ groups except unsubstituted alkyl groups having more than 6 carbon atoms and substituted alkyl groups having more than 9 carbon atoms;

7. Morpholinium halides of general formula

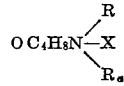

wherein R and R$_a$ are as above defined and X represents a halogen; and

8. Quaternary ammonium compounds corresponding to any of the general formulas

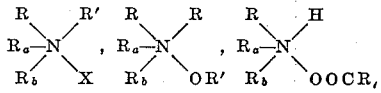

and

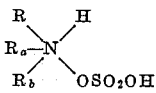

wherein R, R', R$_a$, R$_b$ and X are as above defined.

Examples of the catalysts defined by general formula set forth in Table I include: tri ethyl amine; tri methyl amine; di methyl, octadecyl amine; di ethyl, butyl amine; tri isopropyl amine; tri butyl amine; tri amyl amine; tri hexyl amine; di amyl, butyl amine; ethyl, isopropyl, dodecyl amine; di butyl, octyl amine; methyl, hexyl, nonyl amine; di methyl, (phenyl methyl) amine; di ethyl, (phenyl methyl) amine; di methyl, (hyroxy phenyl methyl) amine; di ethyl, (diethyl amino ethyl) amine; di ethyl, (amino propyl) amine; di methyl, (hydroxy isopropyl) amine; di ethyl, (hydroxy ethyl) amine; di propyl, ethanol amine; di ethyl, isopropanol amine; methyl, propyl, aminopropyl amine; di ethyl, dibutyl aminoethyl amine; di propyl, hydroxybenzyl amine; methyl, ethyl, dimethylbenzyl amine; di isopropyl, aminobenzyl amine; di methyl, ethyl hydroxy benzyl amine; ethyl, isopropyl, ethoxybenzyl amine; diethyl, dichlorbenzyl amine; di propyl, iodobenzyl amine; di methyl, methoxy bromobenzyl amine; methyl, dipropanol amine; ethyl, bis(dimethylbenzyl) amine; isopropyl, ethanol, aminopropyl amine; methyl, dibenzyl amine; methyl, diethylaminopropyl, benzyl amine; ethyl, methoxy iodobenzyl, ethanol amine; methyl, ethylbenzyl, aminoethyl amine; ethyl, bis(aminoethyl) amine; dimethyl, octylphenoxyethoxyethyl amine, methyl, isopropyl, butenyl amine; di ethyl, octadecenyl amine; di propyl, eicosenyl amine; methyl, ethyl, 2,5-hexadienyl amine; di methyl, phenylbutyl amine; di ethyl, dipropylphenyl hexyl amine; methyl, isopropyl, methoxy butyl amine; di propyl, phenoxydecyl amine; di methyl, stearyl amine; di butyl, (phenyl methyl) amine; amyl, di(aminopropyl) amine; methyl, hexyl, aminobenzyl amine; methyl, aminobutyl, ethoxymethyl amine; isopropyl, butoxyethyl, hydroxyisopropyl amine; butyl, amyl, nonenyl amine; hexyl, orthochlorbenzyl, ethanol amine; ethyl, octenyl, phenoxybutyl amine; methyl, propenyloxyethyl, octadecyl amine; N-methyl, N-butyl, hydroxy benzyl amine; ethyl, aminopropyl, butoxymethyl amine; methyl, butyl, ethylphenoxymethyl amine; isopropyl, dibutylaminoethyl, hexadecenyl amine; di hexyl, hydroxy ethyl amine; methyl morpholine; ethyl morpholine; amyl morpholine; methyl, butoxymethyl morpholinium bromide; ethyl, benzyl morpholinium bromide; isopropyl, octenyl morpholinium chloride; butyl, propoxybutyl morpholinium iodide; hexyl, hydroxyethyl morpholinium chloride; methyl, phenoxypropyl morpholinium chloride; propyl, aminopropyl morpholinium bromide; amyl, butyl morpholinium chloride; isopropyl, propenyloxymethyl morpholinium iodide; tetrabutyl urea; 1,1 dibutyl urea; 1,1 di methyl urea; 1,1 diethyl urea; tetra ethyl urea; tri propyl urea; alpha picoline; beta picoline; gamma picoline; tetra methyl ammonium fluoride; tri ethyl, octadecyl ammonium iodide; ethyl, dipropyl, dodecyl ammonium chloride; tetra ethyl ammonium bromide; di methyl, ethyl, hexadecyl ammonium bromide; tri methyl, hexadecyl ammonium bromide; di propyl, amyl, dodecyl ammonium hydroxide; tri ethyl, dimethylbenzyl ammonium chloride; tri ethyl, benzyl ammonium bromide; tri ethyl, benzyl ammonium chloride; di methyl, dodecyl, benzyl ammonium chloride; di methyl, octadecyl, benzyl ammonium chloride; tri methyl, benzyl ammonium hydroxide; tri methyl, benzyl ammonium butoxide; di methyl, butyl, butenyl ammonium fluoride; di methyl, dodecyl, benzyl ammonium fluoride; di methyl, aminoisopropyl, benzyl ammonium methoxide; tri ethyl, hydroxyethyl ammonium hydroxide; methyl, dipropyl, octadecenyl ammonium ethoxide; di methyl, octylphenoxyethoxyethyl, benzyl ammonium chloride; tri ethyl ammonium hydrochloride; methyl, diisopropyl ammonium acetate; di butyl, hydroxybenzyl, ammonium hydrobromide; di propyl, diethylaminobenzyl, octenyl ammonium iodide; ethyl, butyl, propenyloxymethyl, chlorbenzyl ammonium chloride; dimethyl, ethyl, octadecenyl ammonium bromide; diethyl, bis(aminoisopropyl) ammonium bromide; di methyl, bis(hydroxyethyl) ammonium iodide; di isopropyl, hydroxypropyl ammonium sulfate.

The effect of the specific chloride reactant on the efficiency of the reaction and the effect of the use of a specific catalyst are generally illustrated by the examples set forth in Tables II, III, IV and V.

Each example set forth in said tables represents the result obtained when a reaction mixture composed of carbonate reactant, the named chloride reactant and the named catalyst was reacted for a number of hours and the crude reaction product distilled or otherwise treated to obtain the carbonate. The carbonate reactant was carbonate of sodium and in most cases was used in molar excess of the chloride reactant.

Table II illustrates the efficiency of a preferred catalyst, triethylamine, when used with various chloride reactants. The product shown in this table is the simple ester derived from the indicated chloride except in the last three examples given where the mixed ester was produced.

Table II

| Chloride Reactant | Amount of catalyst, mol per mol of chloride reactant | Amount of Carbonate Product formed, percent of theoretical | Temperature of Reaction, °C. | Reaction time, hrs. |
|---|---|---|---|---|
| Benzyl | .056 | 35.9 | 90 | 24 |
| Do | .056 | 71.3 | 100 | 24 |
| Do | .056 | 72.1 | 110 | 24 |
| Do | .056 | 75.8 | 120 | 24 |
| Do | .056 | 68.8 | 130 | 24 |
| Do | .056 | 28.9 | 110 | 2 |
| Do | .056 | 53.7 | 110 | 5 |
| Do | .056 | 69.8 | 110 | 10 |
| Do | .056 | 77.3 | 110 | 15 |
| Do | .022 | 51.2 | 110 | 20 |
| Do | .036 | 75.8 | 110 | 20 |
| Do | .056 | 79.8 | 110 | 20 |
| Do | .072 | 82.1 | 110 | 20 |
| Do | .108 | 79.1 | 110 | 20 |
| Do | .056 | 67.3 | 100 | 24 |
| Do | .056 | 61.4 | 100 | 24 |
| Do | .056 | 57.6 | 100 | 24 |
| Do | .056 | 36.0 | 100 | 24 |
| Do | .056 | 54.3 | 110 | 20 |
| Do | .056 | 72.7 | 110 | 20 |
| Do | .056 | 77.4 | 110 | 20 |
| Do | .056 | 78.5 | 110 | 20 |
| Do | .056 | 83.1 | 110 | 20 |
| Do | .056 | 77.7 | 110 | 20 |
| Methyl Benzyl | .072 | 86.4 | 110 | 20 |
| Ethyl Benzyl | .072 | 82.6 | 110 | 20 |
| iso-Propyl Benzyl | .072 | 56.4 | 100 | 24 |
| sec-Butyl Benzyl | .072 | 34.7 | 100 | 24 |
| Do | .051 | 58.5 | 110 | 15 |
| Amyl Benzyl | .072 | 38.2 | 100 | 24 |
| Di-isopropyl Benzyl | .072 | 35.1 | 100 | 24 |
| Diethyl Benzyl | .072 | 51.0 | 100 | 24 |
| Do | .072 | 66.6 | 110 | 20 |
| Do | .042 | 47.9 | 100 | 24 |
| Methyl, isopropyl Benzyl | .072 | 39.2 | 100 | 24 |
| Polymethyl Benzyl | .072 | 70.7 | 100 | 24 |
| Do | .072 | 74.7 | 110 | 22 |
| 2,4,6 Trimethyl Benzyl | .072 | 26.5 | 100 | 24 |
| (ortho) Dimethyl Benzyl | .072 | 76.9 | 100 | 24 |
| (meta) Dimethyl Benzyl | .072 | 77.7 | 100 | 24 |
| (para) Dimethyl Benzyl | .072 | 77.5 | 100 | 24 |
| (3°) Dimethyl Benzyl | .072 | 80.0 | 100 | 24 |
| (10°) Dimethyl Benzyl | .072 | 81.2 | 100 | 24 |
| (3°) Dimethyl Benzyl | .004 | 16.0 | 100 | 15 |
| (10°) Dimethyl Benzyl | .014 | 58.7 | 100 | 24 |
| Do | .029 | 77.7 | 100 | 24 |
| Do | .042 | 78.2 | 100 | 24 |
| Do | .058 | 77.7 | 100 | 24 |
| Do | .072 | 76.3 | 100 | 24 |
| Do | .108 | 75.1 | 100 | 24 |
| (Industrial) Dimethyl Benzyl | .080 | 88 | 90 | 20 |
| Do | .080 | 81 | 100 | 20 |
| Do | .080 | 74 | 110 | 20 |
| Do | .080 | 60 | 120 | 20 |
| (10°) Dimethyl Benzyl | .072 | 40.7 | 100 | 24 |
| Do | .072 | 45.9 | 100 | 20 |
| Do | .072 | 69.0 | 100 | 20 |
| Do | .072 | 73.4 | 100 | 20 |
| Do | .072 | 80.2 | 100 | 20 |
| Do | .072 | 77.9 | 100 | 20 |
| Do | .072 | 64.9 | 100 | 20 |
| Do | .072 | 82.4 | 100 | 24 |
| Do | .072 | 78.4 | 100 | 24 |
| Do | .072 | 71.2 | 100 | 24 |
| (Ortho) Dimethyl Benzyl | .072 | 76.9 | 90 | 20 |
| Do | .072 | 57.2 | 100 | 5 |
| Do | .072 | 82.3 | 100 | 10 |
| Do | .072 | 84.3 | 100 | 15 |
| Do | .072 | 81.6 | 100 | 20 |
| Do | .072 | 78.2 | 110 | 20 |
| Do | .072 | 76.7 | 120 | 20 |
| (Industrial) Dimethyl Benzyl | .072 | 73.3 | 100 | 24 |
| Do | .036 | 58.0 | 100 | 24 |
| (3°) Dimethyl Benzyl | .036 | 32.0 | 100 | 24 |

Table II—Continued

| Chloride Reactant | Amount of catalyst, mol per mol of chloride reactant | Amount of Carbonate Product formed, percent of theoretical | Temperature of Reaction, °C. | Reaction time, hrs. |
|---|---|---|---|---|
| Naphthobenzyl | .064 | 30.8 | 100 | 24 |
| Do | .068 | 42.5 | 110-120 | 20 |
| Methyl Naphthobenzyl | .072 | 83.6 | 100 | 24 |
| Dimethyl Naphthobenzyl | .078 | 64 | 100 | 24 |
| Ethoxy Benzyl | .036 | 53.5 | 90 | 15 |
| Phenoxy Benzyl | .072 | 36.8 | 100 | 24 |
| Thenyl | .072 | 13 | 100 | 19 |
| ortho-Chlor Benzyl | .056 | 52.7 | 100 | 24 |
| Do | .056 | 59.7 | 110 | 24 |
| Do | .056 | 56.0 | 120 | 24 |
| Do | .072 | 70.0 | 100 | 24 |
| Do | .072 | 65.3 | 110 | 24 |
| para Chlor Benzyl | .072 | 78.0 | 110 | 20 |
| 2,4 Dichlor Benzyl | .072 | 67.8 | 110 | 22 |
| 3,4 Dichlor Benzyl | .072 | 35.3 | 100 | 23 |
| Do | .072 | 68.8 | 110 | 20 |
| Chlor (10°) Dimethyl Benzyl | .072 | 59.0 | 100 | 15 |
| Do | .072 | 75.8 | 100 | 24 |
| Iodo (Industrial) Dimethyl Benzyl | .072 | 41.0 | 100 | 15 |
| Benzyl+3,4 Dichlor Benzyl | .072 | 20 | 110 | 20 |
| Do | .072 | 48 | 110 | 20 |
| Benzyl+Ethyl Benzyl | .072 | 35 | 100 | 20 |

Table III illustrates the action of catalysts of general formula $RR_aR_bN$ and of corresponding quaternary ammonium compounds of the general formulae $RR_aR_bR'NX$, $RR_aR_bRNOR'$, $RR_aR_bHNOOCR'$ and $RR_aR_bHNOSO_2OH$. The product shown in the table is the simple ester derived from the indicated chloride.

Table III

| Chloride Reactant | Catalyst | Amount of catalyst, mol per mol of chloride reactant | Amount of Carbonate Product formed, percent of theoretical | Temperature of Reaction, °C. | Reaction time, hrs. |
|---|---|---|---|---|---|
| Benzyl | Tri-n-propyl amine | .056 | 41.6 | 90 | 24 |
| Do | do | .056 | 40.9 | 100 | 24 |
| Do | do | .056 | 66.0 | 110 | 23 |
| Do | do | .056 | 73.6 | 120 | 24 |
| Do | Tri-n-butyl amine | .056 | 32.0 | 90 | 24 |
| Do | do | .056 | 47.1 | 100 | 25 |
| Do | do | .056 | 64.2 | 110 | 24 |
| Do | do | .056 | 65.2 | 120 | 24 |
| Do | do | .032 | 38.1 | 100 | 24 |
| Do | Triamyl amine | .056 | 53.0 | 120 | 24 |
| Do | do | .056 | 54.1 | 120 | 24 |
| Do | do | .056 | 63.9 | 130 | 24 |
| Do | Trihexyl amine | .072 | 40.3 | 120 | 24 |
| Do | N, N Diethyl Benzylamine | .072 | 29.0 | 100 | 24 |
| Do | N, N Dibutyl Benzyl Amine | .072 | 9.9 | 100 | 24 |
| Do | Triethyl benzyl ammonium chloride | .072 | 65.8 | 120 | 24 |
| Do | Triethyl benzyl ammonium bromide | .055 | 56.3 | 110 | 23 |
| Do | Alkyl, dimethyl, benzyl ammonium chloride | .072 | 52.9 | 120 | 24 |
| Do | Alkyl, dimethyl, benzyl ammonium fluoride | .036 | 32.5 | 110 | 15 |
| (10°) Dimethyl Benzyl | Trimethyl amine | .072 | 20.9 | 100 | 24 |
| Dimethyl Benzyl | Tri-n-propyl amine | .072 | 50.3 | 100 | 24 |
| Do | do | .072 | 49.9 | 110 | 24 |
| Do | do | .072 | 45.9 | 120 | 24 |
| Do | Tri-n-butyl amine | .072 | 10.6 | 90 | 24 |
| Do | do | .072 | 35.4 | 100 | 24 |
| Do | do | .072 | 52.6 | 110 | 24 |
| Do | do | .072 | 54.2 | 120 | 24 |
| Do | Triamyl amine | .072 | 24.0 | 100 | 24 |
| Do | do | .072 | 36.3 | 110 | 24 |
| Do | do | .072 | 58.1 | 120 | 24 |
| Do | Trihexyl amine | .072 | 35.1 | 100 | 24 |
| (ortho) Dimethyl Benzyl | do | .072 | 53.4 | 110 | 24 |
| (10°) Dimethyl Benzyl | do | .072 | 43.9 | 120 | 24 |
| Do | Diethyl, butyl amine | .072 | 72.3 | 100 | 24 |
| Dimethyl Benzyl | Butyl, diamyl amine | .072 | 24.5 | 100 | 24 |
| Do | Dimethyl, octadecyl amine | .072 | 46.5 | 100 | 20 |
| Do | do | .072 | 45.4 | 110 | 20 |
| Do | do | .072 | 35 | 120 | 20 |
| Do | N,N Dimethyl, benzyl amine | .072 | 49.7 | 100 | 20 |
| Do | do | .072 | 73.9 | 110 | 20 |
| Do | do | .072 | 73.7 | 120 | 20 |
| Do | N,N Diethyl benzyl amine | .072 | 26.0 | 100 | 24 |
| Do | N,N Dibutyl, benzyl amine | .072 | 15.1 | 100 | 24 |
| Do | N,N Dimethyl, hydroxy benzyl amine | .072 | 60 | 100 | 20 |
| Do | do | .072 | 53.5 | 110 | 20 |
| Do | do | .072 | 49.7 | 120 | 20 |
| Do | Dimethyl, octylphenoxyethoxyethyl amine | .072 | 48.3 | 100 | 20 |
| Do | Diethylaminomethyl, diethyl amine | .042 | 20.9 | 100 | 23 |
| Do | do | .126 | 14.2 | 100 | 24 |
| Do | do | .072 | 20.4 | 110 | 20 |
| Do | do | .072 | 28.4 | 120 | 20 |
| Do | Aminopropyl, diethyl amine | .072 | 55 | 100 | 20 |

Table III—Continued

| Chloride Reactant | Catalyst | Amount of catalyst, mol per mol of chloride reactant | Amount of Carbonate Product formed, per-cent of theoretical | Temperature of Reaction, °C. | Reaction time, hrs. |
|---|---|---|---|---|---|
| (ortho) Dimethyl Benzyl | Hydroxy isopropyl, dimethyl amine | .036 | 46.5 | 110 | 15 |
| Do | Hydroxyethyl, diethylamine | .036 | 40.5 | 100 | 15 |
| (Solvesso) Dimethyl Benzyl | Methyl, diethanol amine | .072 | 42.0 | 110 | 15 |
| (10°) Dimethyl Benzyl | Triethyl, dimethylbenzyl ammonium chloride. | .072 | 65.4 | 100 | 24 |
| Do | Dimethyl, alkyl, benzyl ammonium chloride. | .072 | 52.8 | 100 | 24 |
| Do | Dimethyl, hexadecyl, benzyl ammonium bromide. | .072 | 55 | 100 | 20 |
| Do | Dimethyl, octadecyl benzyl ammonium chloride. | .072 | 55.6 | 100 | 20 |
| Do | Dimethyl, octadecenyl, ethyl ammonium bromide. | .072 | 40 | 100 | 20 |
| Do | Trimethyl, hexadecyl, ammonium bromide. | .072 | 45 | 100 | 20 |
| (Industrial) Dimethyl Benzyl. | Trimethyl, benzyl ammonium butoxide. | .018 | 23.2 | 100 | 15 |
| (3°) Dimethyl Benzyl | Trimethyl, benzyl ammonium hydroxide. | .036 | 23.5 | 90 | 15 |
| Do | do | .036 | 26.5 | 110 | 15 |
| (Solvesso) Dimethyl Benzyl | Tetraethyl ammonium bromide | .036 | 31.0 | 100 | 15 |
| Do | Triethyl ammonium hydrochloride | .072 | 59.5 | 110 | 15 |
| sec. Butyl Benzyl | N,N-dimethyl benzyl amine | .072 | 55.0 | 120 | 15 |
| Do | Dimethyl, octylphenoxyethoxyethyl amine. | .072 | 30.5 | 120 | 15 |
| Do | Diethyl, aminopropyl, butoxymethyl ammonium chloride. | .036 | 43.0 | 120 | 15 |
| Do | Trimethyl, benzyl ammonium hydroxide. | .036 | 10.0 | 110 | 15 |
| Amyl Benzyl | Trihexyl amine | .072 | 14.5 | 120 | 15 |
| Do | Dimethyl, butoxymethyl, benzyl ammonium chloride. | .072 | 18.5 | 110 | 15 |
| Diisopropyl Benzyl | Dimethyl, hydroxyethyl, orthochlorbenzyl ammonium chloride. | .036 | 6.5 | 110 | 15 |
| Do | Alkyl, dimethyl, benzyl ammonium iodide. | .036 | 28 | 110 | 15 |
| Phenyl Benzyl | Triamyl amine | .072 | 24.5 | 110 | 15 |
| Do | Triethyl, benzyl ammonium bromide. | .036 | 26.0 | 110 | 15 |
| Do | Alkyl, dimethyl, benzyl ammonium fluoride. | .036 | 34.0 | 110 | 15 |
| Do | Dimethyl, butoxymethyl, benzylammonium chloride. | .036 | 22.0 | 110 | 15 |
| Naphthobenzyl | Trimethyl, benzyl ammonium butoxide. | .072 | 25.5 | 110 | 15 |
| Methyl Naphthobenzyl | Dimethyl, octylphenoxyethoxyethylamine. | .072 | 17.0 | 120 | 15 |
| Ethoxy Benzyl | Trimethyl, benzyl ammonium hydroxide. | .036 | 8.5 | 100 | 15 |
| Do | Diethyl, butoxymethyl, aminopropyl ammonium chloride. | .072 | 28.5 | 100 | 15 |
| Do | Alkyl, dimethyl, benzyl ammonium iodide. | .036 | 6.0 | 110 | 15 |
| Do | N,N-dimethyl, benzyl ammonium acetate. | .072 | 52.5 | 110 | 15 |
| Phenoxyl Benzyl | Dimethyl, octylphenoxyethoxyethylamine. | .073 | 18.0 | 110 | 15 |
| Do | Diethyl, hydroxyethyl, orthochlorbenzyl ammonium chloride. | .072 | 23.0 | 110 | 15 |
| Thenyl | Dimethyl, octylphenoxyethoxyethylamine. | .036 | 28.5 | 100 | 15 |
| Do | Diethyl, aminopropyl, butoxymethyl ammonium chloride. | .036 | 5.0 | 100 | 15 |
| ortho Chlor Benzyl | Dimethyl, butoxymethyl, benzyl ammonium chloride. | .036 | 37.0 | 110 | 15 |
| Do | Dimethyl, octadecenyl, ethyl ammonium bromide. | .036 | 32.5 | 110 | 15 |
| Do | Methyl, diethanol ammonium sulfate. | .036 | 24.5 | 110 | 15 |
| para-Chlor Benzyl | Aminopropyl, diethylamine | .072 | 52.0 | 120 | 15 |
| 2,4 Dichlor Benzyl | Di(2-ethylbutyl) ethanol amine | .072 | 1.5 | 130 | 15 |
| Do | do | .072 | 11.0 | 150 | 15 |
| Bromo Dimethyl Benzyl | Trihexyl amine | .072 | 24.5 | 120 | 15 |
| Do | Diethyl, aminopropyl, butoxymethyl ammonium chloride. | .072 | 32.0 | 110 | 15 |
| Iodo Dimethyl Benzyl | Dimethyl, octylphenoxyethoxyethyl amine. | .072 | 36.0 | 120 | 15 |
| Chlor Naphthobenzyl | Tributyl amine | .072 | 30.5 | 110 | 15 |
| Do | Dimethyl, octadecenyl amine | .072 | 30.0 | 110 | 15 |
| Do | Diethyl, aminopropyl, butoxymethyl ammonium chloride. | .036 | 23.0 | 110 | 15 |
| Do | N,N-dimethyl, benzyl ammonium acetate. | .072 | 34.5 | 110 | 15 |
| Chlor Thenyl | Dimethyl, octadecyl amine | .072 | 24.0 | 100 | 15 |

Table IV illustrates the action of catalysts which have a ring bound nitrogen such as pyridine, methyl pyridines, the substituted morpholines and the morpholinium halides. The product shown in the table is the simple ester derived from the indicated chloride.

Table IV

| Chloride Reactant | Catalyst | Amount of catalyst, mol per mol of chloride reactant | Amount of Carbonate Product, percent of theoretical | Temperature of Reaction, °C. | Reaction time, hrs. |
|---|---|---|---|---|---|
| Benzyl | Pyridine | .072 | 26.0 | 110 | 15 |
| Methyl Benzyl | N-ethyl morpholine | .036 | 50.5 | 90 | 15 |
| (10°) Dimethyl Benzyl | Pyridine | .072 | 12 | 100 | 20 |
| Do | N-ethyl morpholine | .072 | 27.1 | 90 | 20 |
| Do | ----do---- | .072 | 44.9 | 100 | 20 |
| Do | ----do---- | .072 | 22.1 | 110 | 20 |
| Do | ----do---- | .072 | 17.5 | 120 | 20 |
| (Ortho) Dimethyl Benzyl | N-Methyl morpholine | .072 | 17.0 | 100-120 | 4.5 |
| (Solvesso) Dimethyl Benzyl | alpha-picoline | .072 | 19.0 | 100 | 15 |
| sec. Butyl Benzyl | gamma-picoline | .072 | 20.0 | 120 | 15 |
| Phenyl Benzyl | Ethyl,benzyl morpholinium bromide | .036 | 6.5 | 110 | 15 |
| Naphthobenzyl | N-ethyl morpholine | .072 | 31.0 | 110 | 15 |
| Methyl Naphthobenzyl | Alpha-picoline | .072 | 11.0 | 120 | 15 |
| Ethoxy Benzyl | Pyridine | .072 | 30.5 | 100 | 15 |
| Do | Methyl,butoxy-methyl morpholinium chloride | .072 | 5.5 | 100 | 15 |
| Phenoxy Benzyl | N-ethyl morpholine | .072 | 47 | 110 | 15 |
| Thenyl | alpha-picoline | .065 | 7.0 | 100 | 15 |
| ortho-Chlor Benzyl | Pyridine | .072 | 19.5 | 110 | 15 |
| 2,4 Dichlor Benzyl | ----do---- | .072 | 12.5 | 110 | 15 |
| Bromo Dimethyl Benzyl | N-methyl morpholine | .072 | 8.5 | 110 | 15 |
| Chlor Thenyl | Methyl butoxymethyl morpholinium chloride | .072 | 30.5 | 100 | 15 |

Table V illustrates the action of other catalysts herein described. The product shown in the table is the simple ester derived from the indicated chloride.

Table V

| Chloride Reactant | Catalyst | Amount of catalyst, mol per mol of chloride reactant | Amount of Carbonate Product, percent of theoretical | Temperature of Reaction, °C. | Reaction time, hrs. |
|---|---|---|---|---|---|
| Benzyl | 1,1 Diethyl urea | .072 | 20.0 | 120 | 15 |
| Methyl Benzyl | 1,1 Dibutyl urea | .036 | 4 | 100 | 15 |
| Do | ----do---- | .036 | 7 | 110 | 15 |
| Do | ----do---- | .036 | 26 | 120 | 15 |
| Do | Triethanol amine | .036 | 14 | 100 | 15 |
| (10°) Dimethyl Benzyl | Tetrabutyl urea | .072 | 11.5 | 100 | 20 |
| Do | ----do---- | .072 | 26.5 | 110 | 20 |
| Do | ----do---- | .072 | 27.8 | 120 | 20 |
| Do | Triethanol amine | .072 | 44.4 | 90 | 20 |
| Do | ----do---- | .072 | 17.5 | 100 | 20 |
| Do | ----do---- | .072 | 13.6 | 120 | 20 |
| Ethyl Benzyl | 1,1 Dimethyl urea | .072 | 43.0 | 110 | 15 |
| sec. Butyl Benzyl | 1,1 Diethyl urea | .072 | 7.5 | 120 | 15 |
| Do | ----do---- | .072 | 9.0 | 130 | 15 |
| Phenyl Benzyl | Triethanol amine | .072 | 22.0 | 110 | 15 |
| Naphthobenzyl | 1,1 Dibutyl urea | .072 | 6.5 | 120 | 15 |
| Do | Triethanol amine | .072 | 15.5 | 110 | 15 |
| Ethoxy Benzyl | Tetrabutyl urea | .036 | 3.5 | 100 | 15 |
| Thenyl | 1,1-dimethyl urea | .036 | 28.0 | 100 | 15 |
| ortho-Chlor Benzyl | ----do---- | .072 | 24.5 | 100 | 15 |
| Do | 1,1-diethyl urea | .072 | 1.5 | 120 | 15 |
| Do | Triethanol amine | .072 | 4.6 | 100 | 15 |
| Bromo Dimethyl Benzyl | ----do---- | .072 | 10.5 | 110 | 15 |
| Chlor thenyl | ----do---- | .072 | 25.0 | 100 | 15 |

In the above tables, the designations in parentheses which appear before the chloride reactant, dimethyl benzyl, indicate the type of xylene used in the original chloro-methylation to prepare the dimethyl benzyl chloride.

In general I prefer to use those catalysts of general formula

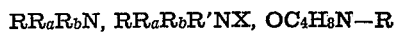

and

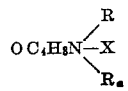

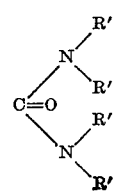

as herein defined. Those compounds in which R, R' and $R_a$ are unsubstituted alkyl groups of not more than 3 carbon atoms appear, in many instances, to be the most active catalysts. Generally the tertiary amines having three unsubstituted alkyl groups will be, because of efficiency, availability and cost, of greatest usefulness in large scale commercial production and, of such amines, triethyl amine is preferred.

As the tabulated examples indicate, however, all of the described catalysts are useful to positively promote carbonate formation in the otherwise practically inactive reaction between the chloride and carbonate of sodium, and thus the choice of the catalyst depends upon availability, cost and the other economics of the particular operation to which the present invention may be applied.

This application is a continuation-in-part of each of my following named applications now abandoned: application Serial No. 18,084, filed March 31, 1948; application Serial No. 65,981, filed December 17, 1948; application Serial No. 65,982, filed December 17, 1948; application Serial No. 65,983, filed December 17, 1948; application Serial No. 65,984, filed December 17, 1948; application Serial No. 65,985, filed December 17, 1948; and application Serial No. 87,119, filed April 12, 1949.

Having thus described my invention, I claim:

1. The process for the production of organic carbonates which comprises heating at temperatures of about 50° to about 150° C. a substantially anhydrous mixture of carbonate of sodium and a compound selected from the group consisting of

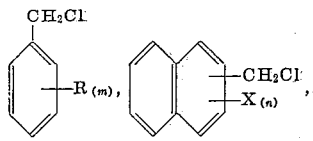

and

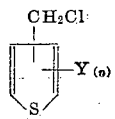

wherein R is a substituent selected from the group consisting of halogen, lower alkyl, lower alkoxy, phenyl, phenoxy, and combinations thereof, $m$ is a number from zero to five, the number of carbons in the substituents being not greater than six; X is selected from the group consisting of halogen, methyl, and combinations thereof; Y is a halogen and $n$ is a number from zero to two; in the presence of a nitrogen bearing organic compound as a catalyst, said organic compound being characterized by the fact that three valences of said nitrogen are satisfied by attachment to a carbon atom, no more than two of said valences being satisfied by the same carbon atom.

2. The process for the production of organic carbonates which comprises heating at temperatures of about 50° to about 150° C. a mixture in which free water is not substantially in excess of two percent by weight, the mixture comprising carbonate of sodium and a compound selected from the group consisting of

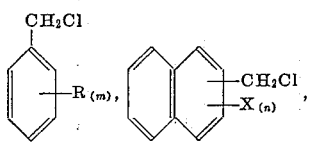

and

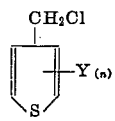

wherein R is a substituent selected from the group consisting of halogen, lower alkyl, lower alkoxy, phenyl, phenoxy, and combinations thereof, $m$ is a number from zero to five, the number of carbons in the substituents being not greater than six; X is selected from the group consisting of halogen, methyl, and combinations thereof; Y is a halogen and $n$ is a number from zero to two; in the presence of a nitrogen bearing organic compound as a catalyst, said organic compound being characterized by the fact that three valences of said nitrogen are satisfied by attachment to a carbon atom, no more than two of said valences being satisfied by the same carbon atom.

3. The process set forth in claim 2 in which the carbonate of sodium is present in the mixture in molar excess of the chloride reactant.

4. The process set forth in claim 2 in which the nitrogen bearing organic compound is a tertiary amine characterized by the fact that three valences of its nitrogen are satisfied by attachment to a carbon atom, no more than two of said valences being satisfied by the same carbon atom.

5. The process set forth in claim 2 in which the nitrogen bearing organic compound is a quaternary ammonium compound characterized by the fact that three valences of its nitrogen are satisfied by attachment to a carbon atom, no more than two of said valences being satisfied by the same carbon atom.

6. The process set forth in claim 2 in which the catalyst comprises triethyl benzyl ammonium chloride.

7. The process set forth in claim 2 in which the catalyst comprises a tripropyl amine.

8. The process set forth in claim 2 in which the catalyst comprises N,N dimethyl benzyl amine.

9. The process set forth in claim 2 in which the catalyst is triethyl amine.

10. The process set forth in claim 2 in which the catalyst is N-ethyl morpholine.

CHARLES ADAM HEIBERGER.

References Cited in the file of this patent

Gomberg: J. Am. Chem. Soc., vol. 42, pp. 2067–72 (1920).